MAGNETIC AMPLIFIER PULSE GENERATORS

Filed Jan. 31, 1958 2 Sheets-Sheet 1

INVENTORS
HARVEY A. MILLER
HENRY EISLER
BY Elmer J. Gorn
ATTORNEY

INVENTORS
HARVEY A. MILLER
HENRY EISLER
BY Elmer J. Gorn
ATTORNEY 2,873,422
Patented Feb. 10, 1959

2,873,422

MAGNETIC AMPLIFIER PULSE GENERATORS

Harvey A. Miller, Natick, and Henry Eisler, Brighton, Mass., assignors to Raytheon Manufacturing Company, Waltham, Mass., a corporation of Delaware Application January 31, 1958, Serial No. 712,411

3 Claims. (Cl. 323—89)

This invention relates to a pulse generator utilizing a magnetic amplifier.

Magnetic amplifiers have been used to derive rectified pulses of D. C. energy from an A. C. source directly. In the simplest form of such a circuit, as shown in Fig. 1 of Patent No. 2,783,315, issued February 26, 1957, to R. A. Ramey, a single pulse during a particular half cycle of the supply voltage was obtained. In order to obtain such a pulse on either of the two half cycles of the supply voltage, Ramey found it necessary to use two cores. The use of two cores adds undesirable weight, bulk and expense.

By the circuit of this invention, a pulse during either half cycle of the supply voltage is obtained, making use of only one core. Briefly, this is accomplished by means of a saturable core with two preferably equal windings connected in series aiding, with a preferably center-tapped source of alternating potential, two opposing rectifiers and a usually reversible signal voltage whose reference or zero point is connected to the alternating supply center tap. The result is to produce a pulse, the leading edge of which is varying in phase with the amplitude or phase of the opposing voltages in series with each winding. This pulse, before or after differentiation, may be used to trigger a grid-controlled gaseous discharge device, such as a thyratron, to give a controlled D. C. power supply or used to control other triggered devices. These results are obtained by the use of a single saturable core, preferably having a rectangular hysteresis loop. The phase of the resulting pulse can be controlled by either a D. C. or an A. C. signal. The circuit has what is commonly called single cycle response; any change in the control voltage is reflected in the output within one-half to one cycle of the supply voltage. The effects of noise and short-time transients are minimized as the device depends upon the average value of the controlled voltage over a half cycle. The circuit may be used to control a wide range of power outputs. The control circuit proper of the invention need not use tubes. It can use transistors and other solid controlled devices. The circuit lends itself to compact construction as it uses few components. When the circuit is used to control the speed and direction of rotation of a motor, the reference voltage may be derived in series with the field voltage, thus permitting field loss protection to be achieved without additional equipment. In such an application the circuit also permits the introduction of the features of quick slow down, quick breaking and quick reversing without requiring additional equipment. A dead zone in the control characteristic may be introduced by lowering the amplitude of the A. C. supply voltage.

Other and further advantages of this invention will be apparent as the description thereof progresses, reference being had to the accompanying drawings in which.

Figure 1:
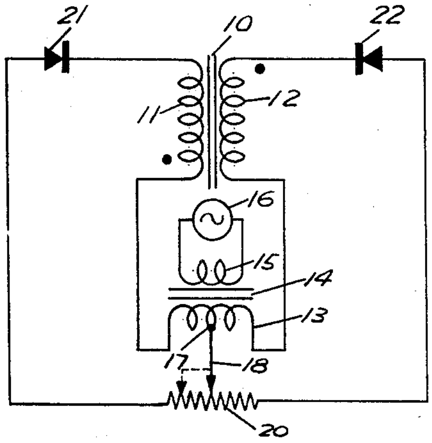
Fig. 1 is a schematic diagram of a circuit illustrating the principles of the invention.
Figure 3B:
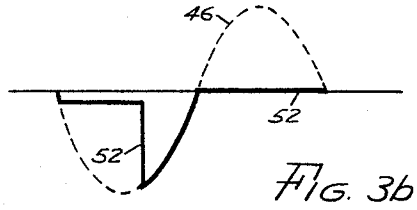
Figure 3A:
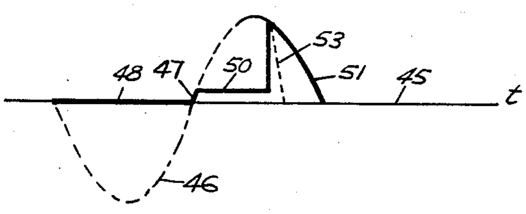
Figure 4:
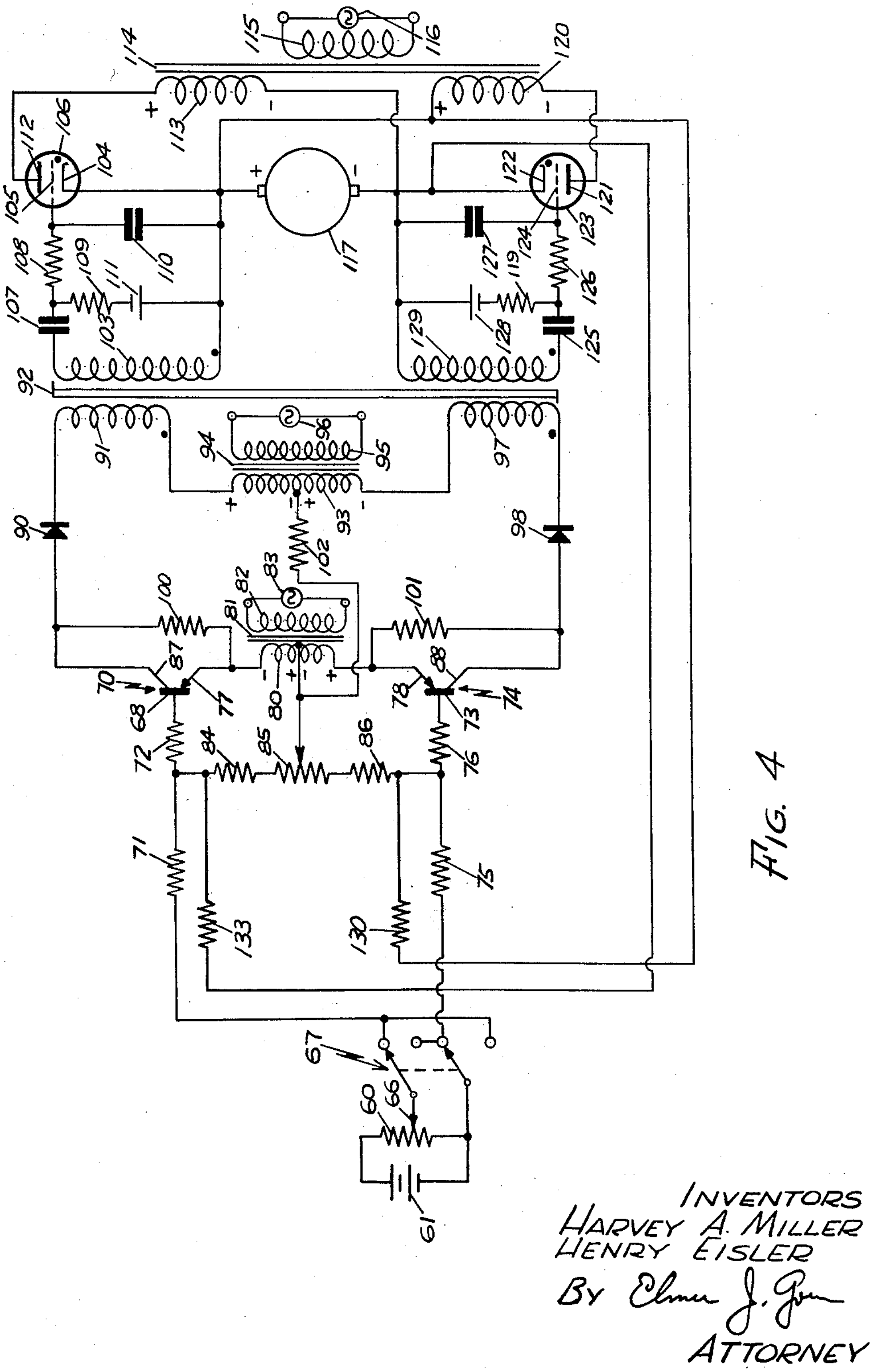

Fig. 3*a* is a graph of the voltage on the right hand side of the potentiometer shown in Fig. 1 with the arm moved to the right;

Fig. 3*b* is a graph of the voltage on the left hand side of the potentiometer shown in Fig. 1 with the arm moved to the left; and Fig. 4 is a schematic diagram of a motor control circuit utilizing the pulse generator of the invention.

In Fig. 1, the reference numeral 10 designates a saturable core having two windings 11 and 12 that, for the purpose of simplifying the description, will be considered to be of the same number of turns. The lower end of winding 11 is connected to the lower end of winding 12 through the secondary winding 13 of a transformer 14, the primary 15 of which is connected to a source of A. C. potential 16. The center tap 17 of the secondary 13 is connected to the arm 18 of potentiometer 20. The upper end of each winding 11 and 12 is connected to an end of the potentiometer 20 through a rectifier 21 or 22, respectively, connected in opposing polarity.

Figure 2:
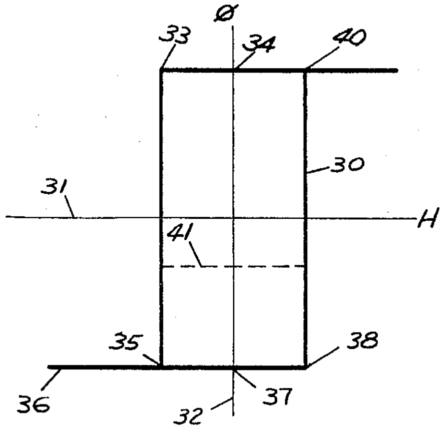
Fig. 2 is a graphic representation of the hysteresis loop of a saturable core ideal for use in this circuit.

The material used for the core 10 preferably has a rectangular hysteresis loop 30, shown in Fig. 2, in which the magnetizing force H is plotted along the horizontal line 31 and the flux density is plotted along the vertical line 32. With the arm 18 positioned in the middle of the potentiometer 20, current will increase through the winding 11 on the negative-going alternations, and a magnetizing force will be applied to the core 10 represented by the displacement of the operating point from the initial point 34 representing the retained magnetic flux density ultimately attaining point 33. As the current continues to flow, the magnetization of the core will be reversed in polarity to the point 35 where the core is saturated, as represented by line 36. As the negative alternation decreases to zero, the magnetization returns to the operating point 37. As the positive alternation begins, the winding 12 conducts current until it reaches a value represented by point 38 in terms of magnetizing force when the magnetization of the core moves toward zero and ultimately saturates in the opposite polarity at the point 40. As the positive alternation reduces to zero, the magnetization of the core returns to the point 34. It will be seen that with the arm 18 of the potentiometer 20 in the center, there is no difference beween the sides of the hysteresis graph of Fig. 2, provided there is sufficient A. C. voltage supplied to the transformer 14. When the applied A. C. voltage is more than sufficient to move the flux around the hysteresis loop, an output pulse will appear on both sides and there will be no dead zone. This feature is useful for control purposes.

However, if the arm 18 is moved to the right, the resistance of the left hand side of the potentiometer 20 is greater, and the negative alternation will not be able to produce enough voltage to reach the level of flux density represented by the line 36 but will reach a level indicated by the dotted line 41, but on the positive alternation, there will be more than enough voltage to saturate the core. This reduces the voltage across the winding to a very low value, and, therefore, following saturation most of the voltage drop will occur across the right hand side of the potentiometer 20 after saturation.

The variation of the voltage across each side of the potentiometer is shown in Figs. 3*a* and *b* where time is plotted along the horizontal line 45 and the applied A. C. voltage as the dotted line 46 plotted vertically. The solid line 47 in Fig. 3*a* indicates the voltage drop across the right hand side of the potentiometer 20 with the arm 18 moved to the right. On the negative alternation no current flows through the right hand side of the potentiometer due to the polarity of the rectifier 22, as indicated by the level 48. On the positive alternation, only the magnetizing current flows through this portion of the potentiometer until the core is saturated, as shown by the line 50. When the core is saturated, the voltage which its winding will support is reduced and more current flows with a sudden increase in the voltage drop across the right hand side of the potentiometer 20, as shown by the portion 51 of the graph 47 in Fig. 3*a*. Furthermore, if the arm 18 is moved by the same amount to the left, the functions of the sides of the potentiometer are reversed and the voltage across the right hand side of the potentiometer is greater in the negative half cycle, as indicated by the curve 52 in Fig. 3*b*. The extent of the displacement of the arm 18 of the potentiometer 20 from the center determines the phase of the pulse. The direction of the displacement determines in which alternation of the applied A. C. it occurs when the A. C. is not sufficient to saturate the core on both alternations. Under the conditions of Fig. 3*a* little or no voltage is developed across the left hand side of the potentiometer. Under the conditions of Fig. 3*b* little or no voltage is developed across the right hand side of the potentiometer. When the A. C. voltage supplied to the transformer 14 is enough to saturate the core in both alternations when the potentiometer is near its central position, such a pulse will appear across both sides of the potentiometer, but in opposing phase. Under this condition the position of the arm determines the position of the leading edge of both pulses. The pulse may be differentiated to give a short rise time and the resulting sharp pulse indicated by the dotted line 53 used to trigger thyratrons for the speed and direction control of a motor. The two porions of the potentiometer 20 can be replaced by any variable impedance, such as vacuum tubes, transistors, or magnetic amplifiers. Such devices are themselves controllable by variable voltages or currents. The separate voltage source could be substituted for each side of the potentiometer. The gain of such a system can then be expressed as a certain variation in phase angle of the output pulse of the generator for a certain change in control voltage. Furthermore, as the output pulses are used as triggers for a pair of thyratrons the power gain is the change in power output per unit change in power input. This gain can be made high and the system is by nature fast responding.

In Fig. 4, there is shown a reversible variable speed motor drive circuit comprising a speed-indicating feedback, two transistors, a magnetic amplifier and two thyratrons. The speed is represented by the voltage drop across a potentiometer 60 connected across a source 61 of potential which might be a portion of the voltage across the field winding of the motor to be controlled. The arm 66 of the potentiometer 60 is connected through a reversing switch 67 to the base 68 of a transistor 70 through resistors 71 and 72. One end of the potentiometer 60 is connected through the reversing switch 67 to the base 73 of a second transistor 74 through the resistors 75 and 76. The emitters 77 and 78 of the transistors 70 and 74, respectively, are connected together through the center tapped secondary 80 of a transformer 81, the primary 82 of which is connected to a source 83 of potential. The base 68 is also connected to the center tap of the secondary 80 through the resistor 72, a resistor 84, and a potentiometer 85. The base 73 of the transistor 74 is also connected to the center tap of the secondary 80 of the transformer 81 through the resisor 76, resistor 86 and the potentiometer 85. The collector 87 of the transistor 70 is connected to the collector 88 of the transistor 74 through a rectifier 90, a winding 91 on the saturable core 92, the center tapped secondary 93 of a transformer 94, the primary 95 of which is connected to a source 96 of A. C., a second winding 97 on the core 92, and a rectifier 98 connected in the opposite polarity to that of rectifier 90. The collector 87 of the transistor 70 is connected to the emitter 77 of this transistor through an impedance limiting resistor 100. Similarly, the collector 88 of the transistor 74 is connected to the emitter 78 through resistor 101. The center tap of the secondary 80 of the transformer 81 is connected to the center tap of the secondary 93 of the transformer 94 through a resistor 102. A secondary winding 103 on the saturable core 92 is coupled between the cathode 104 and the grid 105 of a thyratron 106 through a capacitor 107 and a resistor 108. A capacitor 110 is also connected between the cathode 104 and the grid 105 of a thyratron 106. A source 111 of negative potential is connected between the grid 105 and the cathode 104 of the thyratron 106 through a resistor 109 and a resistor 108. The anode 112 of the thyratron 106 is connected to the cathode 104 through the secondary 113 of a transformer 114, the primary 115 of which is connected to a source 116 of alternating current, and the armature 117 of the motor to be controlled. A second secondary 120 of the transformer 114 is connected between the anode 121 and cathode 122 of a second thyratron 123 in series with the armature 117. A second secondary 129 on the saturable core 92 is coupled between the cathode 122 and grid 124 of the thyratron 123 through a capacitor 125 and a resistor 126. There is also a capacitor 127 connected between the cathode 122 and the grid 124. In addition there is a source 128 of negative potential connected between the grid 124 and the cathode 122 through a resistor 119 and the resistor 126. One side of the armature 117 is connected to the base 73 of the transistor 74 through resistors 130 and 76. The other side of the armature 117 is connected to the base 68 of the transistor 70 through resistors 133 and 72.

In operation, a portion of the voltage across the armature 117 is algebraically summed with that from the speed setting potentiometer 60, and applied in series with the voltage in half the secondary winding 80 between the base 68 and emitter 77 of the transistor 70, and between the base 73 and the emitter 78 of transistor 74. Variations in these voltages vary the impedance between the emitter 77 and the collector 87 of transistor 68 and the emitter 78 and collector 88 of transistor 74. The result is similar to that obtained by varying the position of the arm 18 of the potentiometer 20. As the impedance of one transistor is increased, that of the other decreases, similar to moving the arm 18 of the potentiometer 20 of Fig. 1. This results in pulses similar to those shown in Fig. 3 which are differentiated by the capacitors 107 and 125 and applied to the grids 105 and 124 of the thyratrons 106 and 123 in the proper polarity. Proper phasing of the plate voltage applied to the thyratrons 106 and 123 allows them to be triggered into conduction by these pulses, supplying current to the armature 117 of the motor to be controlled. As the net voltage applied between the base and emitter of each transistor is varied, the phase of the output pulse is varied and the magnitude and direction of the current supplied to the armature 117 by the thyratrons 106 and 123 is controlled.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. In a magnetic amplifier, a saturable magnetic core, first and second windings on said core, a source of alternating supply voltage having first and second half cycles connected in series with said first and second windings through rectifying means operative to drive said core toward saturation in one direction during the first half cycle, and in the opposite direction during the second half cycle, and means connected in series with each winding for opposing the magnetizing of the core.

2. In a magnetic amplifier, a saturable magnetic core, first and second windings on said core, a source of alternating supply voltage having first and second half cycles connected in series with said first and second windings through rectifying means operative to drive said core toward saturation in one direction during the first half cycle, and in the opposite direction during the second half cycle, and variable impedance means connected in series with each winding opposing the magnetizing of the core.

3. In a magnetic amplifier, a saturable magnetic core, first and second windings on said core, a source of alternating supply voltage having first and second half cycles connected in series with said first and second windings through rectifying means operative to drive said core toward saturation in one direction during the first half cycle, and in the opposite direction during the second half cycle, a transistor means connected in series with each winding for opposing the magnetizing of the core.

References Cited in the file of this patent

UNITED STATES PATENTS 2,787,748 Carlson ---------------- Apr. 2, 1957